(12) United States Patent
Hara et al.

(10) Patent No.: US 6,471,357 B1
(45) Date of Patent: Oct. 29, 2002

(54) PROJECTION DISPLAY DEVICE COMPRISING MEANS FOR COOLING AN OPTICAL UNIT AND AIR QUANTITY CONTROLLING MEANS

(75) Inventors: Nobuyuki Hara, Kanagawa; Takuji Ohkubo, Chiba, both of (JP)

(73) Assignee: Sony Corporation, Tokyo (JP)

( * ) Notice: Subject to any disclaimer, the term of this patent is extended or adjusted under 35 U.S.C. 154(b) by 55 days.

(21) Appl. No.: 09/605,244

(22) Filed: Jun. 28, 2000

(30) Foreign Application Priority Data

Jun. 29, 1999 (JP) ............................................ 11-183021
Aug. 10, 1999 (JP) ............................................ 11-225948

(51) Int. Cl.[7] ........................ G03B 21/18; G03B 21/16; G03B 21/22; G02F 1/1335
(52) U.S. Cl. ............................. 353/57; 353/60; 353/61; 353/119; 349/5
(58) Field of Search ............................ 353/57, 60, 61, 353/119, 74, 75, 76, 77, 78; 348/836, 843; 349/5

(56) References Cited

U.S. PATENT DOCUMENTS

| 3,326,081 | A | * | 6/1967 | White ........................ 353/61 |
| 5,676,442 | A | * | 10/1997 | Fujimori ..................... 353/119 |
| 5,743,611 | A | * | 4/1998 | Yamaguchi et al. .......... 353/31 |
| 6,254,336 | B1 | * | 7/2001 | Ahn ........................... 415/119 |
| 6,280,038 | B1 | * | 8/2001 | Fuse et al. .................... 353/57 |
| 6,290,360 | B1 | * | 9/2001 | Konuma et al. .............. 353/61 |
| 6,322,218 | B1 | * | 11/2001 | Sugawara et al. ............ 353/52 |
| 6,334,686 | B1 | * | 1/2002 | Shiraishi et al. ............. 353/57 |
| 6,398,366 | B1 | * | 6/2002 | Hara et al. ................... 353/57 |

* cited by examiner

Primary Examiner—Russell Adams
Assistant Examiner—Melissa Koval
(74) Attorney, Agent, or Firm—Frommer Lawrence & Haug LLP; William S. Frommer; Gordon Kessler

(57) ABSTRACT

A projection display device includes an optical unit, a cooling fan for cooling the circumference of light valves of the optical unit, and an exterior cabinet accommodating the optical unit and the cooling fan. The cooling fan is in the form of a sirocco fan. Cooling air of the cooling fan is brought to the circumference of the light valves through a duct, and is distributed by air-quantity controlling means arranged in the duct for effective cooling thereof.

20 Claims, 17 Drawing Sheets

FIG.8

| | | AXIAL FLOW FAN | SIROCCO FAN (FLAT MULTIBLADE FAN) | | |
|---|---|---|---|---|---|
| FAN FUNDAMENTAL SPECIFICATIONS | VOLTAGE/CURRENT (V, A) | 12V · 0.21A | 12V · 0.8A | 10V · 0.65A | 8V · 0.5A |
| | POWER CONSUMPTION (W) | 2.61 | 9.6 | 6.5 | 4.0 |
| | MAX. AIR QUANTITY (m³/min) | 0.52(·1) | 0.75 | 0.67 | 0.57 |
| | MAX. STATIC PRESSURE (mmH2O) | 5.22 | 32 | 24 | 15.2 |
| | NOISE LEVEL (dBA) | AT MAX. EFFICIENCY 34 | 46 | 43 | 40 |
| SET MEASUREMENT PERFORMANCE | R AIR QUANTITY (m³/min) | 0.0337 | 0.1273 | 0.1099 | 0.0917 |
| | G AIR QUANTITY (m³/min) | 0.0552 | 0.1341 | 0.1158 | 0.0966 |
| | B AIR QUANTITY (m³/min) | 0.0945 | 0.1760 | 0.1520 | 0.1268 |
| | TOTAL AIR QUANTITY (m³/min) | 0.1834 | 0.4373 | 0.3776 | 0.3152 |
| | FAN EFFICIENCY (%) | 35.3% | 58.3% | 50.4% | 42.0% |
| | R DEFLECTION-PLATE TEMP. (°C) | 50 | 40 | 41 | 43 |
| | G DEFLECTION-PLATE TEMP. (°C) | 56 | 49 | 50 | 53 |
| | B DEFLECTION-PLATE TEMP. (°C) | 61 | 56 | 58 | 61 |
| | SET MOUNTING NOISE (NC) | NC37 | NC43 | NC40 | NC35 |

PROJECTION DISPLAY DEVICE COMPRISING MEANS FOR COOLING AN OPTICAL UNIT AND AIR QUANTITY CONTROLLING MEANS

BACKGROUND OF THE INVENTION

1. Field of the Invention

The present invention relates to projection display devices for projecting to screens or the like images obtained by applying light from light sources to light valves.

2. Description of the Related Art

Projection display devices are prepared for the market, which comprise light valves using liquid-crystal panels, for example, and separates white light emitted from a light source into the three primary colors of red (R), green (G) and blue (B) before modulating the three liquid-crystal panels based on an image signal. Modulated lights are subjected to color synthesis, and then projected enlargedly on a screen through a projection lens for display.

FIGS. 9–10 show a conventional projection display device. The projection display device 1 is provided with an optical unit 2, an axial flow fan 3 for cooling the optical unit 2, and an exterior cabinet or casing 4 having the optical unit 2, the axial flow fan 3, etc. mounted thereto.

The optical unit 2 is provided with a light source or lamp 21, a fly-eye lens group 22, a P-polarization/S-polarizabon (P/S) converter element 23, color separating mirrors or dichroic mirrors 25, 26, reflecting mirrors 24, 27, 28, 29, three condenser lenses 30R, 30G, 30B, three sets of light valves 35R, 35G, 35B (refer simply to as 35 in some instances) each 25 comprising an incident side deflection plate 36, liquid-crystal panels 31R, 31G, 31B and an outgoing side deflection plate 37, a cross prism or dichroic prism 32 for color synthesis, a projection lens 33, and a unit frame 34.

The P/S converter element 23 is formed out of rectangular glasses with a coated dielectric film bonded to each other by an adhesive. Moreover, on the incident side of the liquid-crystal panels 31R, 31G, 31B, the incident side deflection plates or films 36 are bonded to the condenser lenses 30R, 30G, 30B through thin glass plates, respectively. On the outgoing side of the liquid-crystal panels 31R, 31G, 31B, the deflection plates 37 are bonded to the cross prism 32 through thin glass plates, respectively.

Illumination light applied from the light source 21 is equalized by the fly-eye lens group 22, and is adjusted in the deflection direction by the P/S converter element 23, which is then separated into R, G and B by the reflecting mirrors 24, 27, 28, 29 and the color separating mirrors 25, 26.

Color lights applied to the liquid-crystal panels 31R, 31G, 31B through the condenser lenses 30R, 30G, 30B and the deflection plates 36 are modulated by an image signal, and the permeability of each is controlled through the deflection plate 37. In such a way, images formed on the liquid-crystal panels 31R, 31G, 31B are color composed by the cross prism 32, and are projected to an external screen (not shown) through the projection lens 33.

When passing through the deflection plates 36, 37, light is partly absorbed by the deflection plates to produce a temperature rise thereof. There are arranged cooling means for retraining this temperature rise, which comprise intake openings 38R, 38G, 38B arranged in the lower side of the unit frame 34 to face the three liquid-crystal panels 31R, 31G, 31B and the deflection plates 36, 37, and exhaust openings 39R, 39G, 39B arranged in the upper side of the unit frame 34 to face the intake openings 38R, 38G, 38B.

The axial flow fan 3 is disposed below the optical unit 2, i.e. roughly beneath the cross prism 32, and serves to blow cooling air on the three liquid-crystal panels 31R, 31G, 31B, the deflection plates 36, 37, etc. through the intake openings 38R, 38G, 38B arranged in the unit frame 34, which is then exhausted outside from an exhaust port, (not shown) arranged in the exterior cabinet 4 through the exhaust openings 39R, 39G, 39B.

Next, the shape or configuration of the exterior cabinet of the projection display device will be described. Referring to FIGS. 15–17, when viewing from the shape of their exterior cabinets, the projection display devices can be classified into a vertically lengthened projection display device 1001 wherein the direction of separating and synthesizing light emitted from the light source is defined as the vertical direction, and a horizontally lengthened projection display device 2001 wherein the direction of separating and synthesizing light emitted from the light source is defined as the horizontal direction. In recent years, for achieving a size and weight reduction of the device, the vertical projection display device is often used which allows a reduction in size of the optical system for separation and synthesis of light emitted from the light source, since the liquid-crystal panels are of the shorter vertical length than the horizontal length.

Referring to FIGS. 15–16, the conventional vertical projection display device 1001 is provided with an optical unit 102, an axial flow fan or cooling fan 103 for cooling the optical unit 102, and an exterior cabinet or casing 104 having the optical unit 102, the axial flow fan 103, etc. mounted thereto.

The optical unit 102 is provided with a light source or lamp 121, a fly-eye lens group 122, a P/S converter element 123, color separating mirrors or dichroic mirrors 125, 126, reflecting mirrors 124, 127, 128, 129, three condenser lenses 130R, 130G, 130B, three sets of light valves 135R, 135G, 135B (refer simply to as 135 in some instances) each comprising an incident side deflection plate 136, liquid-crystal panels 131R, 131G, 131B and an outgoing side deflection plate 137, a cross prism or dichroic prism 132 for color synthesis, a projection lens 133, and a unit frame 134.

The optical unit 2 is disposed in the vertical exterior cabinet 104 with the light source 121 side down and the light valves 135 side up.

The P/S converter element 123 is formed out of rectangular glasses with a coated dielectric film bonded to each other by an adhesive. Moreover, on the incident side of the liquid-crystal panels 131R, 131G, 131B, the incident side deflection plates or films 136 are bonded to the condenser lenses 130R, 130G, 130B through thin glass plates, respectively. On the outgoing side of the liquid-crystal panels 131R, 131G, 131B, the deflection plates 137 are bonded to the cross prism 132 through thin glass plates, respectively.

Illumination light applied from the light source 121 is equalized by the fly-eye lens group 122, and is adjusted in the deflection direction by the P/S converter element 123, which is then separated into red (R), green (G) and blue (B) by the reflecting mirrors 124, 127, 128, 129 and the color separating mirrors 125, 126.

Color lights applied to the liquid-crystal Panels 131R, 131G, 131B through the condenser lenses 130R, 130G, 130B and the deflection plates 136 are modulated by an image signal, and the permeability of each is controlled through the deflection plates 137. In such a way, images formed on the liquid-crystal panels 131R, 131G, 131B are color composed by the cross prism 132, and are projected to an external screen (not shown) through the projection lens 133.

When passing through the deflection plates 136, 137, light is partly absorbed by the deflection plates to produce a temperature rise thereof. There are arranged cooling means for retraining this temperature rise, which comprise, as shown in FIG. 16, intake openings 138R, 138G, 138B arranged in one side 134a of the unit frame 134 to face the three liquid-crystal panels 131R, 131G, 131B and the deflection plates 136, 137, and exhaust openings 139R, 139G, 139B arranged in another side 134b of the unit frame 134 to face the intake openings 138R, 138G, 138B.

The axial flow fan 103 is disposed roughly just beside the cross prism 132 of the optical unit 102, and serves to blow outside air or cooling air on the three liquid-crystal panels 131R, 131G, 131B, the deflection plates 136, 137, etc. through an intake port 104a arranged in one side of the exterior cabinet 104 and the intake openings 138R, 138G, 138B arranged in the unit frame 134, which is then exhausted outside from the exhaust openings 139R, 139G, 139B arranged in the unit frame 134 and an exhaust port 104b arranged in another side of the exterior cabinet 104.

The above projection display device 1 could contribute to an enhancement of the brightness due to a technical improvement of the light source 21, optical parts, etc. On the other hand, with an enhancement of the brightness, an improvement in cooling performance forms an essential task to restrain a temperature rise of, e.g. the deflection plates 36, 37, etc.

On the other hand, a problem arises with regard to the noise level of projection display devices when operated in conference rooms, etc. Traditionally, axial flow fans are often used having low noise level according to specification catalogs. However, the characteristic of the axial flow fans is favorable to achievement of larger air quantity, but not to achievement of larger static pressure. Therefore, in order to pass cooling air to the circumference of the cross prism 32 with greater passage resistance, etc. for further cooling, it is necessary to use an axial flow fan with larger capacity than required or apply it at high-voltage drive and high rotation, deteriorating fan noise. Moreover, filters are usually disposed at an inlet of fans to prevent adhesion of dust to optical parts, which also deteriorates the noise level.

Then, projection display devices are developed using a sirocco fan as a cooling fan. As illustrated in the characteristic drawing of static pressure vs. air quantity in FIG. 11, the sirocco fan secures greater air quantity at higher static pressure compared with the axial flow fan. Accordingly, the sirocco fan has the advantage of being capable of sending cooling air to spots with larger passage resistance in the projection display device for effective cooling. On the other hand, due to its larger noise level compared with the axial flow fan having the same capacity, an inconvenience occurs in conferences taking place with a projection display device.

Moreover, with the conventional vertical projection display device 1001, as described above, the axial flow fan 103 is disposed close to the incident side deflection plate 136, the liquid-crystal panels 131R, 131G, 131B and the outgoing side deflection plate 137 for their cooling, and the intake port 104a and the exhaust port 104b are thus arranged in the sides of the exterior cabinet 104 as shown in FIG. 16. Consequently, when using the vertical projection display device disposed on a table T or the like, an operator and an audience will directly hear noise resulting from the axial flow fan 103 through the intake port 104a and the exhaust port 104b. Therefore, the vertical projection display device 1001 produced a problem of higher noise level than that of the horizontal projection display device 2001 which allows the axial flow fan 103 to be disposed on the bottom.

SUMMARY OF THE INVENTION

It is, therefore, an object of the present invention to provide projection display devices of high cooling efficiency and low noise which allow effective cooling of optical units by cooling air and noise reduction for the whole device up to the level at which an inconvenience fails to occur in conferences, etc.

Another object of the present invention is to provide vertical projection display devices having reduced outline dimensions which allow efficient cooling of the incident side deflection plates, the liquid-crystal panels and the outgoing side deflection plates, and reduced level of noise level resulting from ventilation.

One aspect of the present invention is to provider a projection display device comprising an optical unit comprising a light source and a group of light valves, means for cooling said optical unit, said cooling means comprising a sirocco fan, a duct for bringing a cooling air produced by said sirocco fan to at least said group of light valves, and means arranged in said duct for controlling an air quantity of said cooling air, and an exterior cabinet accommodating said optical unit and said cooling means.

The sirocco fan can produce cooling air with higher, static pressure in the duct, achieving efficient cooling of spots with higher passage resistance such as a light valve, etc. The air-quantity controlling means arranged in the duct distribute cooling air with higher static pressure in the optical unit, enabling cooling in generally favorable conditions.

Another aspect of the present invention is to provide a vertical projection display device which brings cooling air of the cooling fan disposed in the lower part of the exterior cabinet to the light valves disposed in the upper part thereof. Arrangement of the cooling fan in the lower part of the exterior cabinet contributes to a reduction in noise level. Moreover, since the cooling fan is in the form of a sirocco fan which enables ventilation with higher static pressure, cooling air can be provided to the light valves disposed in the upper part of the exterior cabinet through the duct.

The inventive projection display devices are provided preferably, with the air-quantity controlling means for allowing the duct to bring cooling air to the light valves at a desired ratio.

Moreover, the inventive projection display devices including the air-quantity controlling means are provided, preferably, with the group of light valves comprising a first light valve for modulating red light, a second light valve for modulating green light, and a third light valve four modulating blue light, wherein the air-quantity controlling means bring cooling air to the first, second and third light valves at an air-quantity ratio of 1:2:3. Such a structure allows ideal ventilation to the light valves.

Preferably, the air-quantity controlling means are constructed so that air-quantity adjustment is possible from the outside of the exterior cabinet. Such a structure allows the ratio of cooling to parts of the optical unit air to be able to be controlled suitably easily from the outside.

It is preferable that the duct brings part of cooling air to the light source of the optical unit. With such a structure, cooling air with higher static pressure produced by the sirocco fan is available to cooling of the light source disposed in a different position from the light valves.

Moreover, it is preferable that the duct is arranged with a plate for adjusting the air quantity of cooling air. Such a structure allows appropriate cooling of both the light valves and the light source.

Preferably, the inventive projection display devices further comprise a fan for dispersing heat generated by the light source, the fan providing an air quantity controlled in accordance with output of the light source. Such a structure allows the fan to be controlled at an air quantity required for cooling of the light source, resulting in possible reduction in noise in accordance with output of the light source.

It is desirable that the sirocco fan provides an air quantity controlled in accordance with output of the light source.

Moreover, it is desirable that the exterior cabinet has, preferably, an exhaust port for cooling air in a surface on which a projection lens is disposed. With such a structure, when projecting images through the projection lens, cooling air after cooling each part of the optical unit can be exhausted in the direction of a screen where no person exists generally.

BRIEF DESCRIPTION OF THE DRAWINGS

These and other objects and features of the present invention will become clear from the following description of the preferred embodiments given with reference the accompanying drawings, in which:

FIG. 8 is a table showing the relationship between the fundamental specifications of sirocco fans and the measured air quantity and temperature of the sirocco fans and an axial flow fan;

DESCRIPTION OF THE PREFERRED EMBODIMENTS

Figure 1:
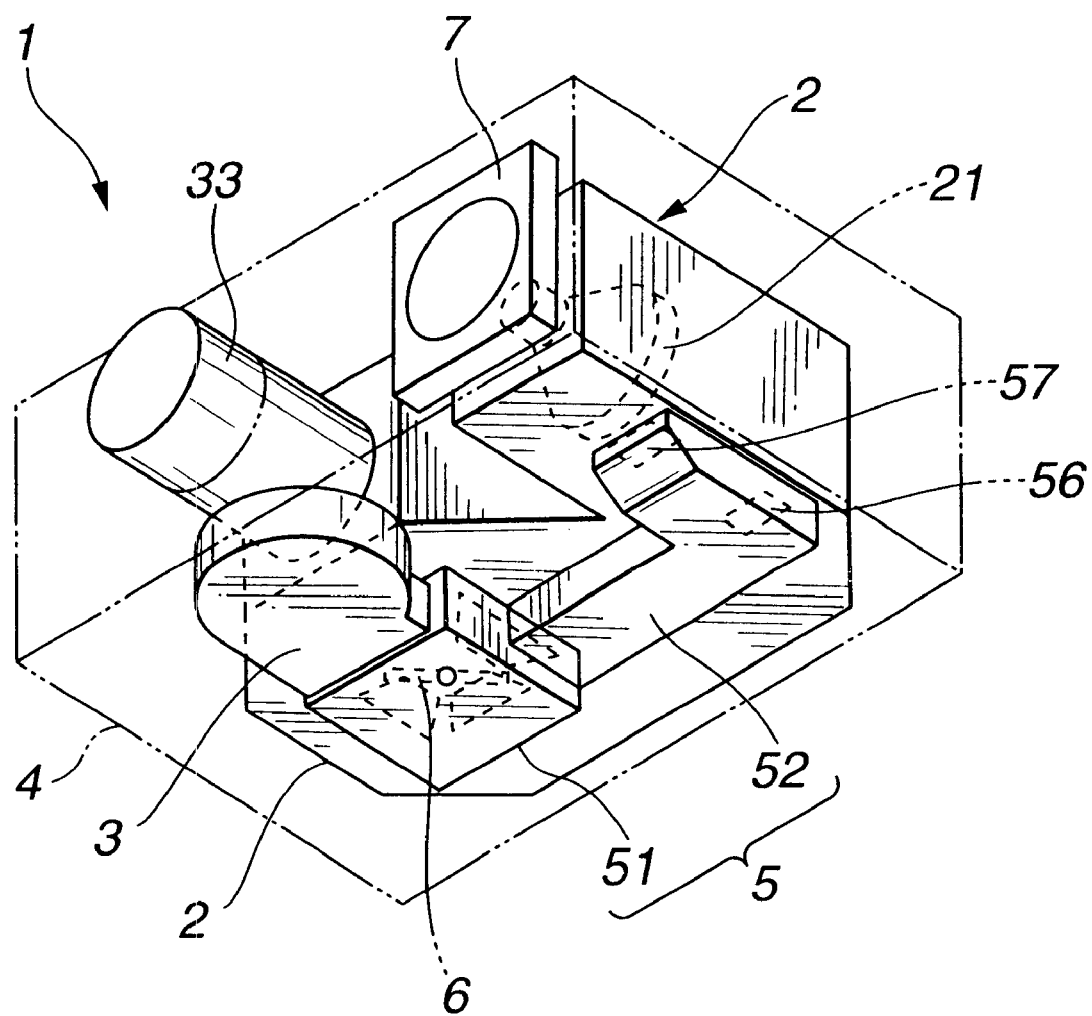
FIG. 1 is a perspective view showing a first embodiment of a projection display vice embodying the present invention.

Referring to the drawings wherein like references designate like parts throughout the views, a description will be made with regard to the preferred embodiments of a projection display device embodying the present invention.

Figure 2:
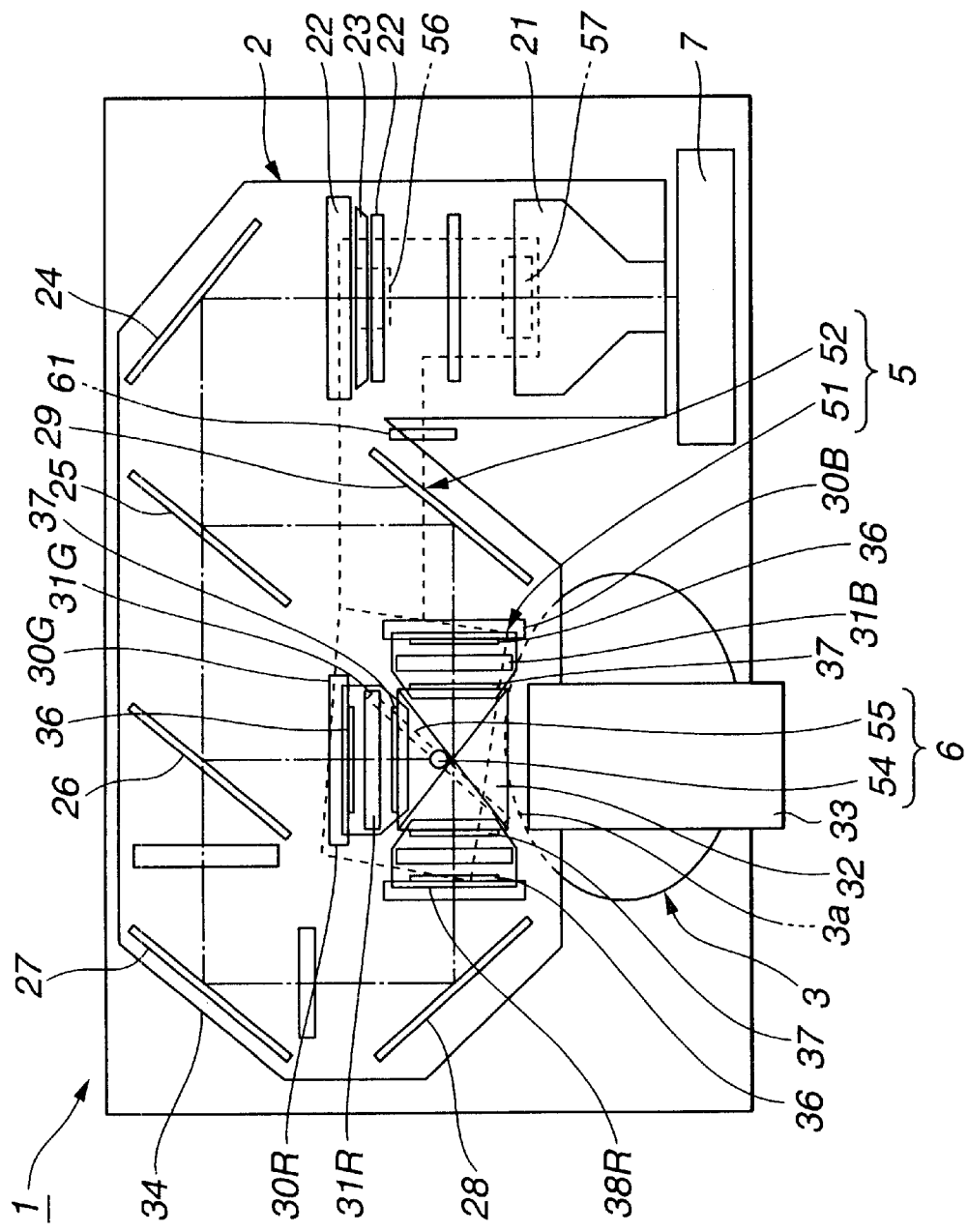
FIG. 2 is a schematic plan view showing the projection display device.
Figure 3:
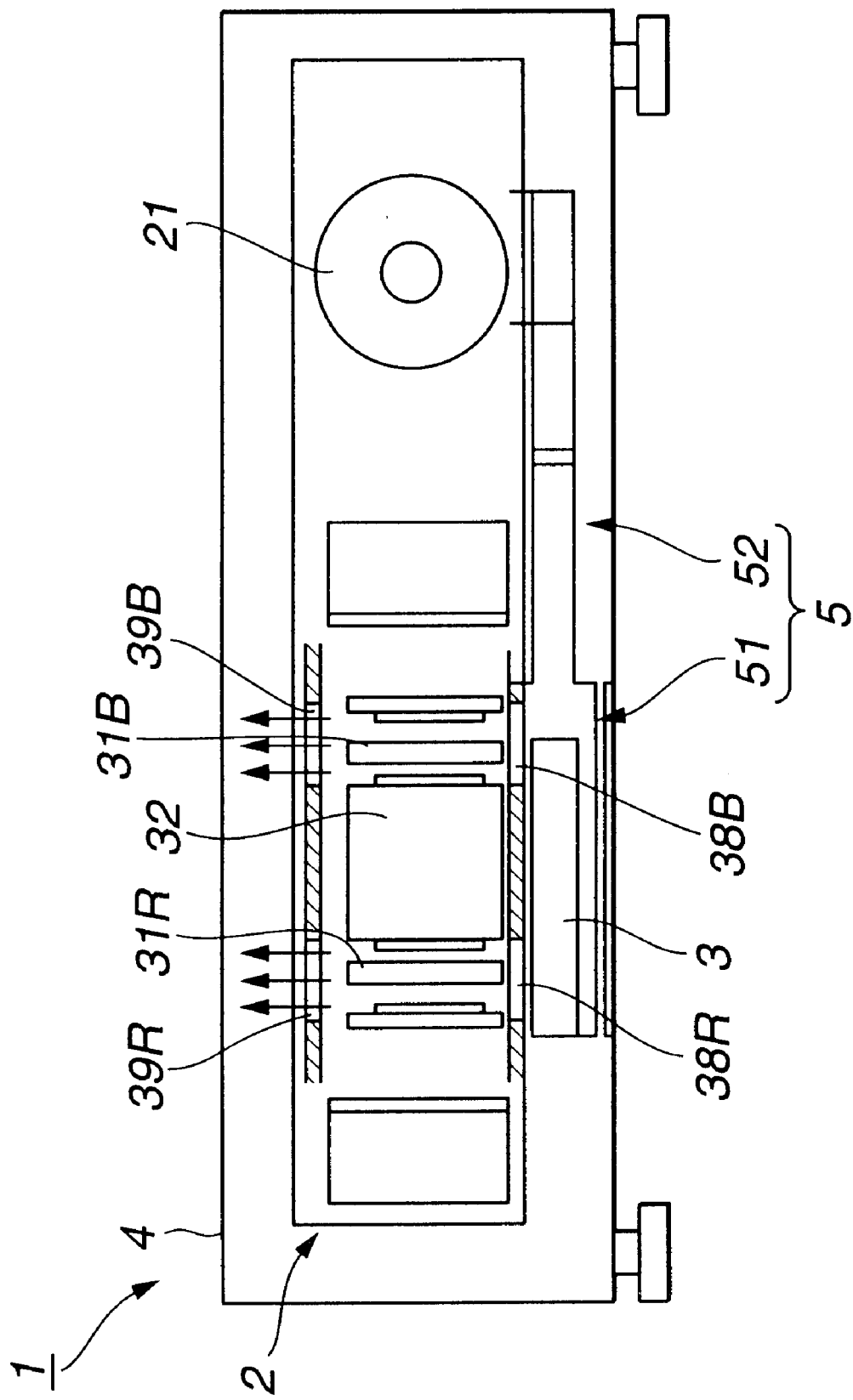
FIG. 3 is schematic sectional view showing the projection display device.

Referring to FIGS. 1–3, a projection display device 1 is provided with an optical unit 2, a cooling fan 3 for cooling the optical unit 2, and an exterior cabinet or casing 4 having the optical unit 2 and the sirocco fan 3 mounted thereto, a duct 5 for bringing cooling air produced by the cooling fan 3 to the optical unit 2, air-quantity control means 6 arranged in the duct 5 and for bringing cooling air produced by the cooling fan 3 to light valves 35 of the optical unit 2 at a predefined ratio, and a light-source exhaust fan 7.

Figure 9:
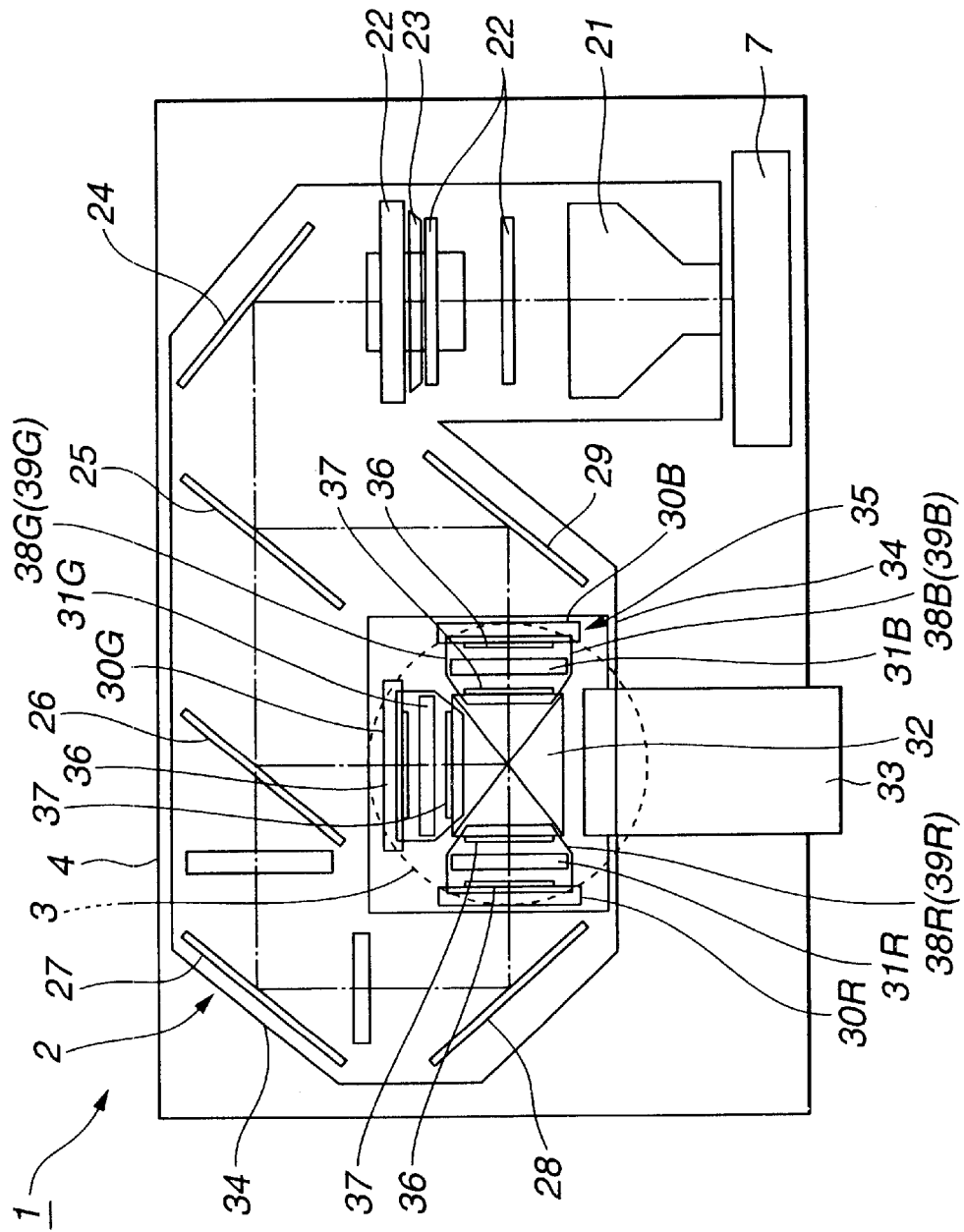
FIG. 9 is a view similar to FIG. 2, showing a traditional projection display device.
Figure 10:
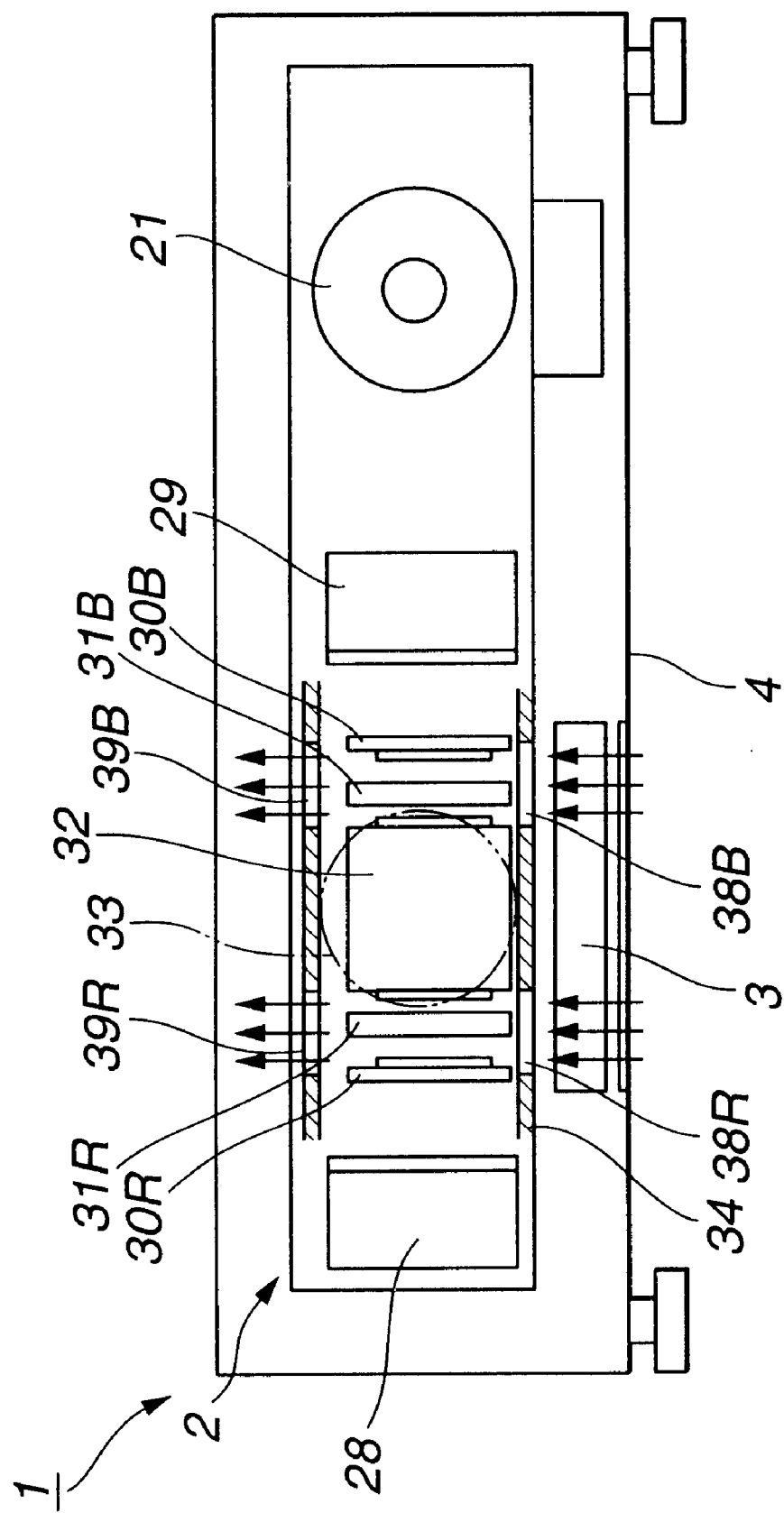
FIG. 10 is a view similar to FIG. 5, showing the traditional projection display device.
Figure 11:
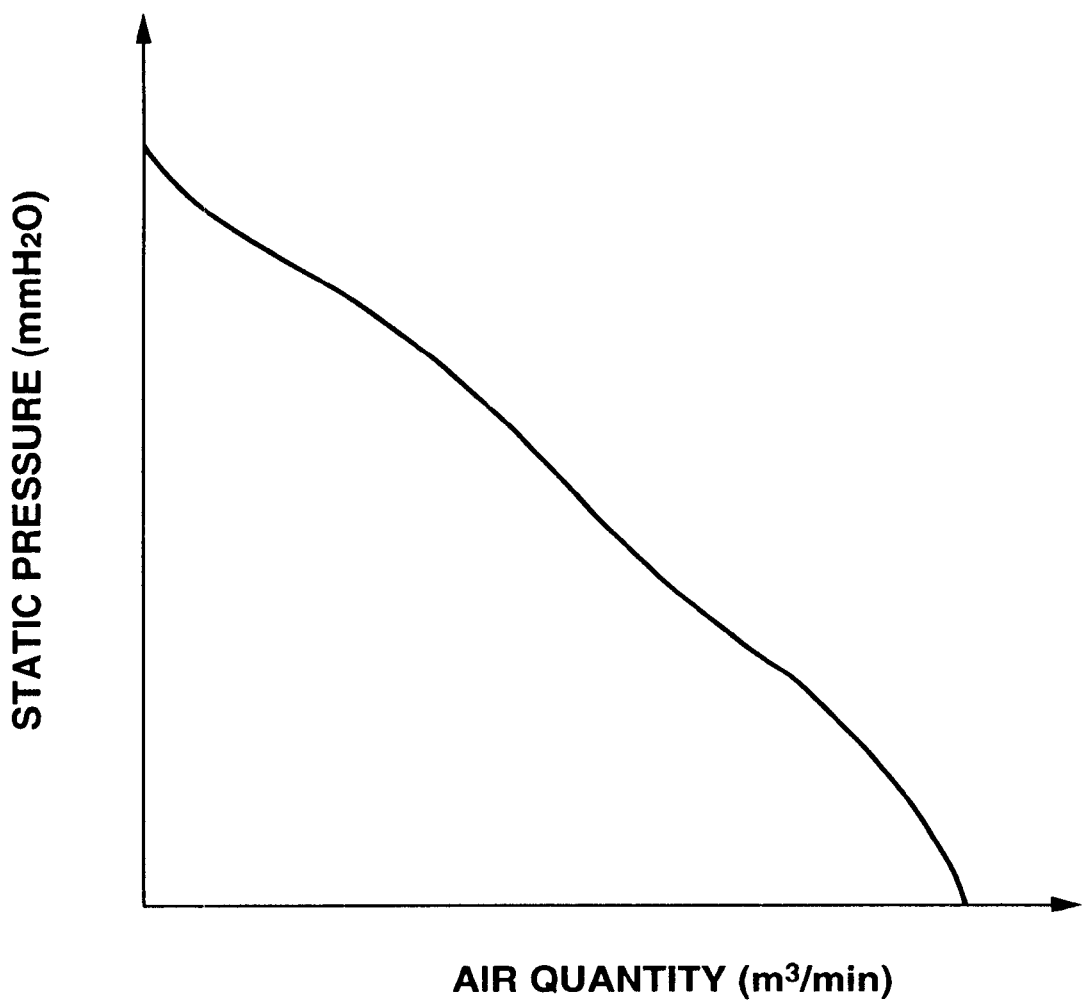
FIG. 11 is a view similar to FIG. 7, illustrating a characteristic curve of static pressure vs. air quantity.

The optical unit 2 is of substantially the same structure as that of the traditional optical unit as shown in FIGS. 9–10, so that a redundant description is omitted.

The cooling fan 3 is in the form of a sirocco fan or flat multi-blade fan. The cooling fan 3 is disposed between the projection lens 33 and the exterior cabinet 4 with a ventilation port 3a facing the lower side of intake openings 38R, 38G, 38B for the light valves 35R, 35G, 35B arranged in the optical unit 2. Cooling air out of the ventilation port 3a of the cooling fan 3 is brought to each part of the optical unit 2 through the duct 5.

As shown in FIGS. 2–3, the duct 5 is provided with a first duct portion 51 for bringing cooling air out of the cooling fan 3 to the circumference of the cross prism 32 of the optical unit 2, and a second duct portion 52 for bringing cooling air to the circumference of a light source 21.

Figure 4:
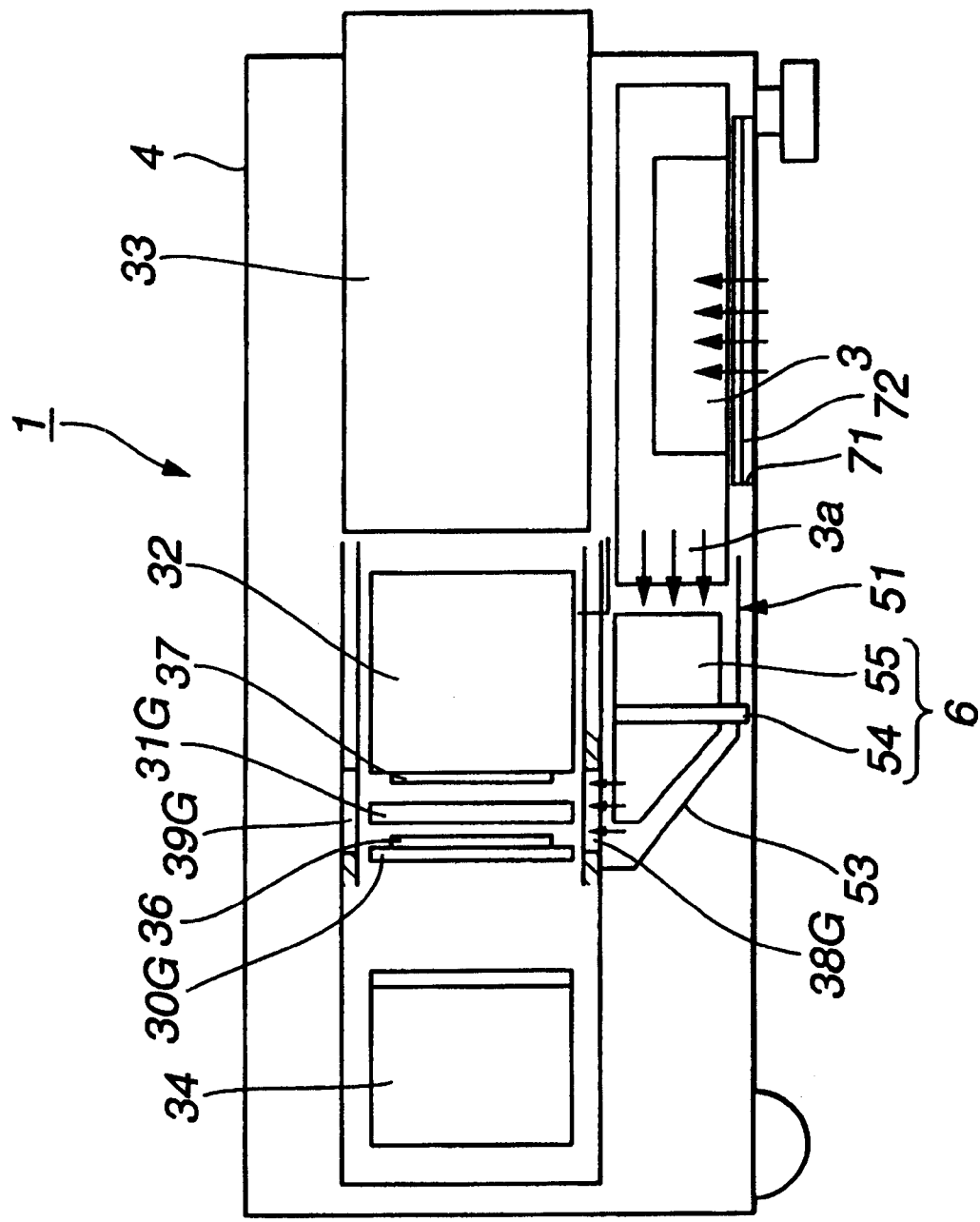
FIG. 4 is a view similar to FIG. 3, showing a first duct of the projection display device.
Figure 5:
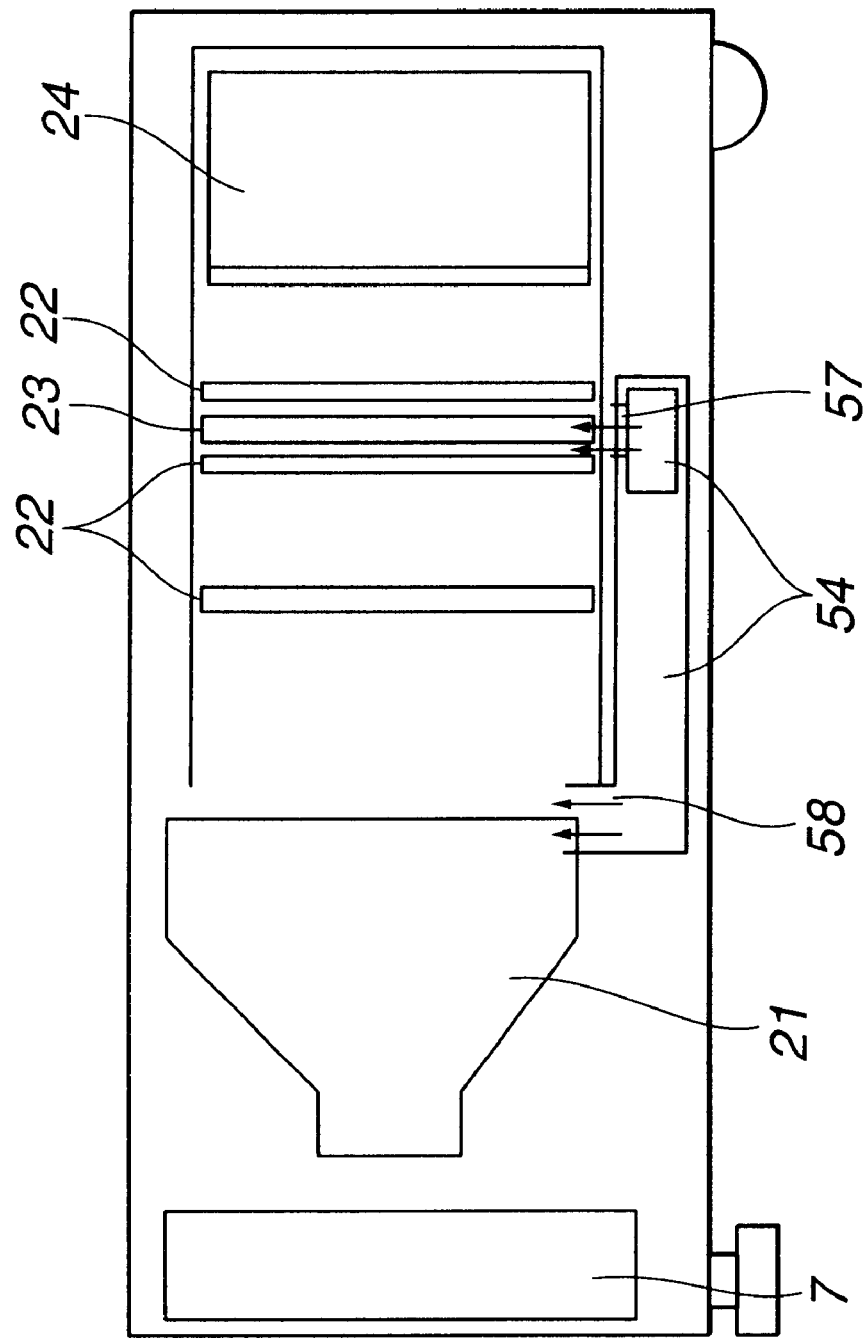
FIG. 5 is a view similar to FIG. 4, showing a second duct of the projection display device.

Referring to FIG. 4, the first duct portion 51 is provided with an inclined face 53 for changing the direction of cooling air out of the cooling fan 3, and the air-quantity control means 6 for controlling the air quantity of cooling air introduced into the intake openings 38R, 38G, 38B arranged in the optical unit 2. Cooling air out of the cooling fan 3 is changed in direction by roughly 90 by striking the inclined face 53, and is controlled in air quantity by the air-quantity control means 6 before being provided to the cross prism 32 through the intake openings 38R, 38G, 38B.

The inclined face 53 is arranged, preferably, below the intake openings 38G, 38B for the light valves 35G, 35B which require greater air quantity for cooling.

The air-quantity control means 6 comprise an air-quantity control plate 55 rotatably mounted by a shaft 54. The air-quantity control plate 55 is rotated about the above shaft 54 to control the angle of the airquantity control plate 55, obtaining fine adjustment of the, quantity of air introduced into the intake openings 38R, 38G, 38B. The air-quantity control means 6 can be operated from the outside through appropriate operation means (not shown).

Figure 6:
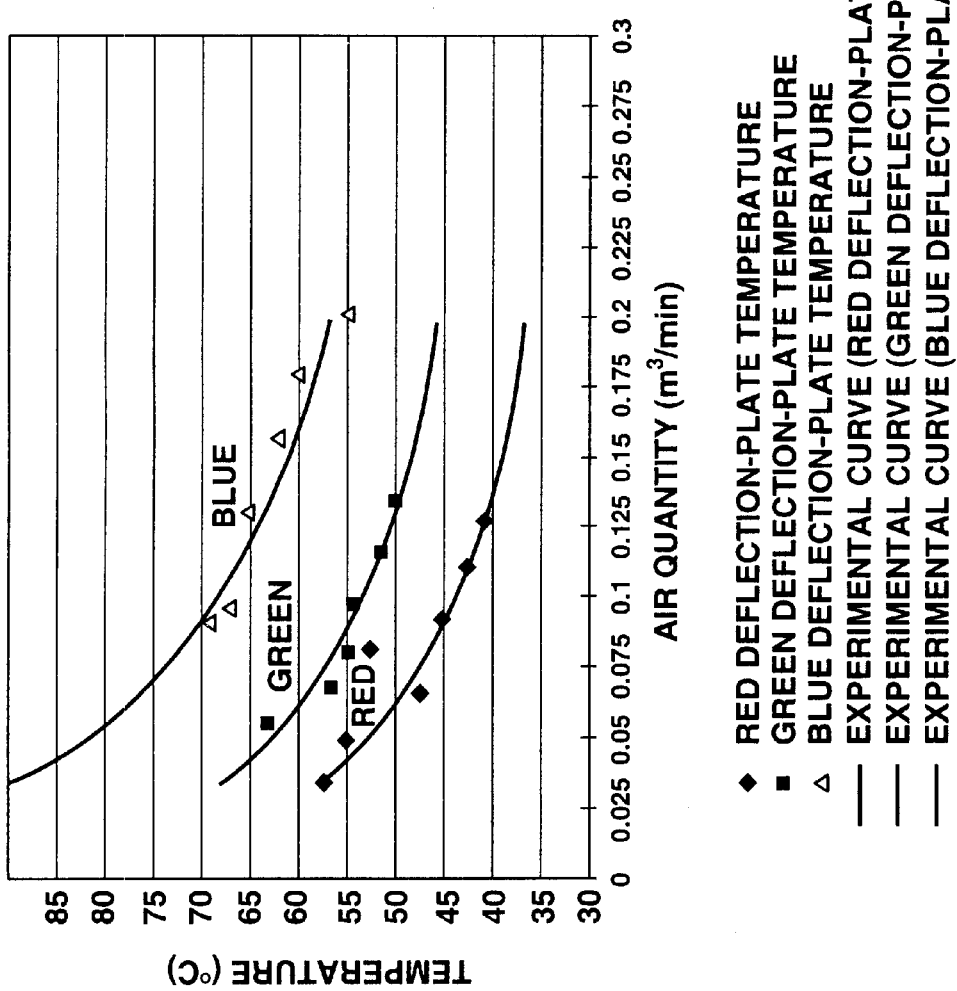
FIG. 6 is a graph illustrating characteristic curves of measured deflection-panel temperature vs. air quantity of an axial flow fan and a sirocco fan.

FIG. 6 shows the relationship between the air quantity and the deflection-plate temperature, and illustrates characteristic curves of air quantity vs. temperature for the intake openings 38R, 38G, 38B. It is understood that the provision of an appropriate balance of the air quantity in accordance with the curves allows preservation of the deflection plates in an appropriated temperature range.

The results of experiments revealed that the temperature of the light valves 35 can be reduced generally and most efficiently by distributing cooling air from the intake openings 38R, 38G, 38B to the deflection plates 36, 37 and liquid-crystal panels 31R, 31G, 31B each interposed therebetween at the air-quantity ratio of 1:2:3 in this order.

As shown in FIG. 2, the second duct portion 52 extends from one end of the first duct portion 51 to below the light source 21 via below a P/S converter element 23 of the optical unit 2. The first duct portion 51 has first and second openings 56, 57 in a portion facing the P/S converter element 23 and a portion facing the light source 21. Cooling air, passing through the above first duct portion 51 and being controlled by the air-quantity control means 6, is introduced into the second duct portion 52 to strike both the P/S converter element 23 through the first opening 56 and the light source 21 through the second opening 57. It is then exhausted by the light-source exhaust fan 7 to the outside of the exterior cabinet 4 through an exhaust port (not shown). Since the exhaust port is arranged in the front face of the exterior cabinet 4, air can generally be exhausted in the direction of a screen where no person exists.

The second duct portion 52 includes an air-quantity adjusting plate 61 upstream of the first opening 56, i.e. on the side of the first duct portion 51.

The air-quantity adjusting plate 61 is actuated in synchronization with a slide switch (not shown) to allow adjustment of the air quantity for the P/S converter element 23 and the light source 21. In the power saving mode set to improve the long-term reliability of the light source 21, the output of the light source 21 is smaller, in accordance with which a reduction is possible in both the air quantity and noise by lowering the voltage, i.e. number of revolutions of the light-source exhaust fan 7. Moreover, the air quantity, i.e. number of revolutions of the cooling fan 3 may be adjusted in accordance with the output of the light source 21.

As shown in FIG. 4, an air intake port 71 is arranged in the lower surface of the exterior cabinet 4 to correspond to the cooling fan 3. A filter 72 is mounted to the air intake port 71. The filter 72 serves to remove dust and the like contained in outside air so as to protect thereby the liquid-crystal panels 31R, 31G, 31B, the cross prism 32, etc. from these dust and the like. When using the filter 72, the intake side inflow resistance is increased to lower the air quantity. In particular, when the cooling fan 3 is in the form of an axial flow fan, noise is increased with lowered air quantity. When the cooling fan 3 is in the form of a sirocco fan, the lowering of the air quantity cannot be avoided, but its noise is rather reduced because of being enclosed in the exterior cabinet 4 due to the hermetic effect of the filter 72.

The duct 5 may be a member separate from the optical unit 2 and/or the exterior cabinet 4 for mounting to the exterior cabinet 4, or may be integrated therewith.

Next, a description will be made with regard to a study of fundamental specifications of fans for reducing the nose level. It is noted that an after-mentioned NC value is adopted to express the noise level, which allows clear definition of the magnitude of noise level which the present invention achieves. This aims to show more concretely the improved noise level compared with the prior art.

A sound pressure represented in decibels with respect to the reference value is referred to as a sound-pressure level. A level obtained by multiplying the sound-pressure level by a frequency correction based on an acoustic characteristic or A characteristic is referred to as a noise level (units of dB (A)). Moreover, there is Noise Criteria (NC) value which represents a value for indicating the degree of hearing disturbance during a conversation of audience. The NC value can be obtained by comparing a sound-pressure level of noise for each frequency band of 31.5–8,000 Hz with a predefined group of frequency curves or NC curves. As for this sound-pressure level, 1) NC 20–30 is considered to be very quiet and enable large conferences; 2) NC 30–35 is considered to be quiet and enable conferences at a 15 feet table and a conversation in normal voice 10–30 feet apart; 3) on the order of NC 25–30 is considered to enable application in a bedroom, a music room, a cinema, etc.; and 4) NC 35–40 is considered to enable a conversation in normal voice 10–15 feet apart and constitute no obstacle to the telephone.

Figure 7:
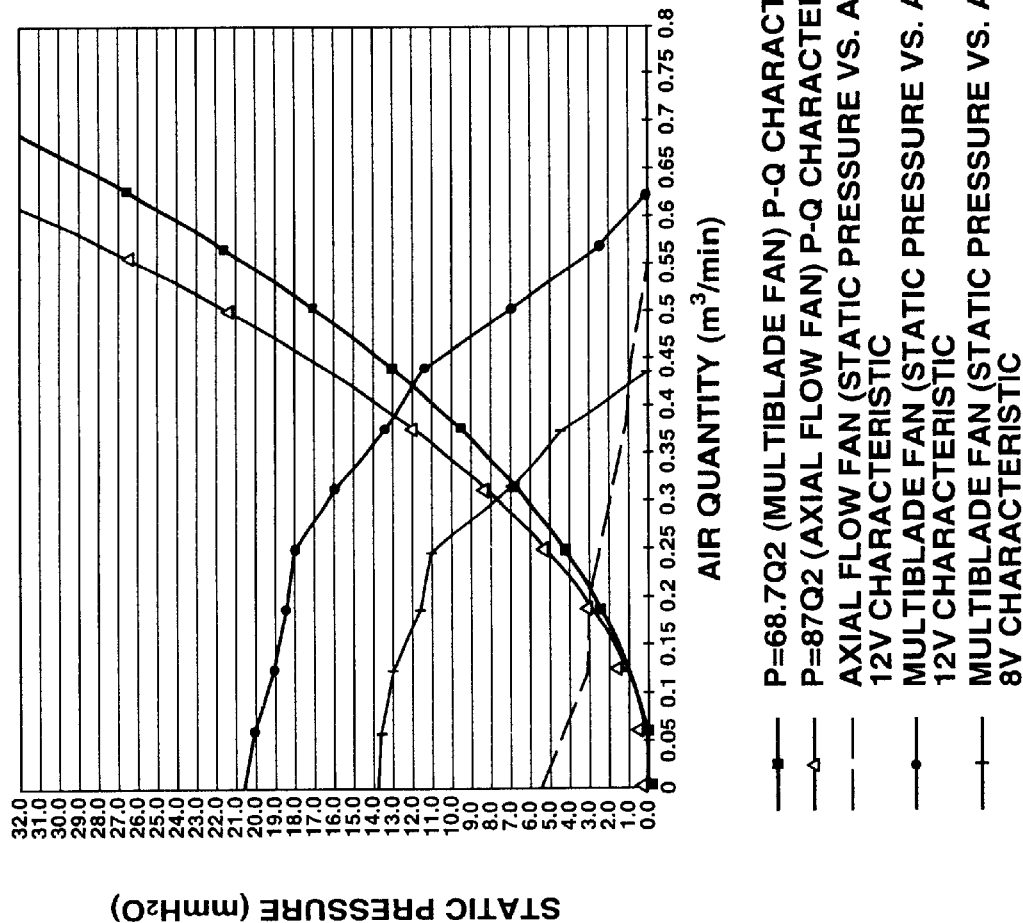
FIG. 7 is a view similar to FIG. 6, illustrating characteristic curves of unit impedance, i.e. pressure vs. air quantity (P-Q) at a cross prism and characteristic curves of static pressure vs. air quantity of the axial flow fan and the sirocco fans.

FIG. 7 shows characteristic curves of unit impedance, i.e. pressure vs. air quantity (P-Q) at the cross prism as a passage resistance and characteristic curves of static pressure vs. air quantity of the axial flow fan and the sirocco fans. It has been found that the sirocco fan is favorable to ventilation for parts of high packaging density or passage resistance, and it enables ventilation of 22–42% with respect to the maximum air quantity even with the drive voltage of about 8 V. With respect to 12 V drive of the axial flow fan, the sirocco fan can secure the air quantity of about 70% extra even with 8 V drive. It is noted that the intersections of the P-Q curves and the static pressure vs. air quantity curves indicate the quantity of air actually provided to the optical unit.

Referring to FIG. 8, the table gives the fundamental specifications of the axial flow fan and the sirocco fan, and their air quantities monitored in accordance with the velocity of cooling air out of the intake openings 31R, 31G, 31B and the opening area thereof. The results revealed that even the 8 V–0.5 A drive sirocco fan can provide a sufficient cooling effect with noise restrained less than NC 35 in the set measurement performance. It is noted that in the experiments, the air-quantity control plate 55 is adjusted so that the temperature of the deflection plates is below the temperature conditions with the axial flow fan. Adjustment of the air-quantity control plate 55 to the optimum air quantity can expect a further cooling effect and thus a noise reduction effect.

In the first embodiment, the air-quantity control means 6 are arranged rotatably and adjustably from the outside. The present invention is not limited thereto, and is also applicable to air-quantity control means fixed or integrated with the duct to merely control the distribution of the air quantity.

Moreover, in the first embodiment, the air-quantity control means 6 are illustrated as one partition plate. It is not limitative, and the air-quantity control means 6 may include a plurality of parts, may be of the shape of a curved surface, and may be made of a porous material which passes part of cooling air.

Figure 12:
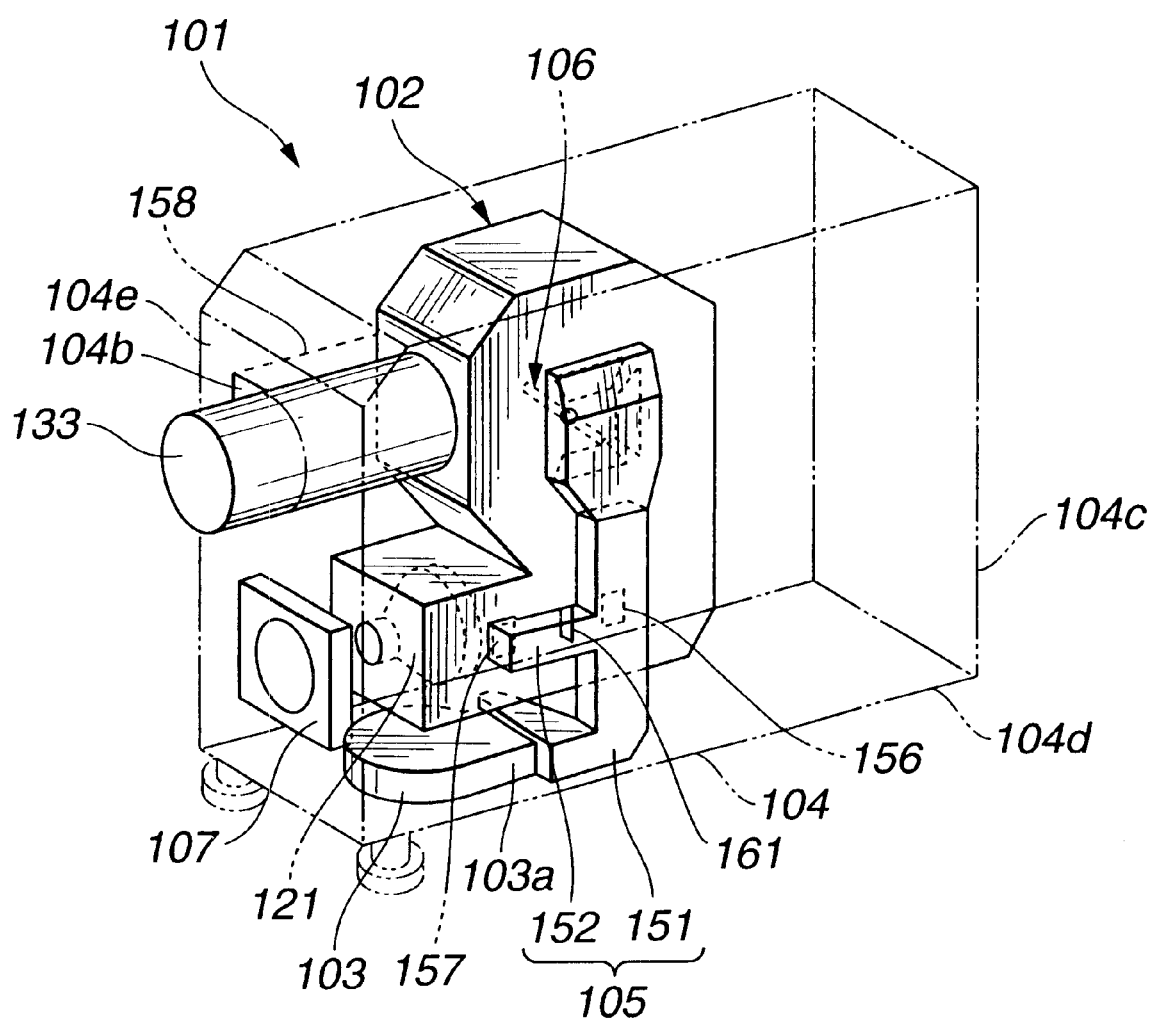
FIG. 12 is a view similar to FIG. 1, showing a second embodiment of the projection display device according to the present invention.
Figure 13:
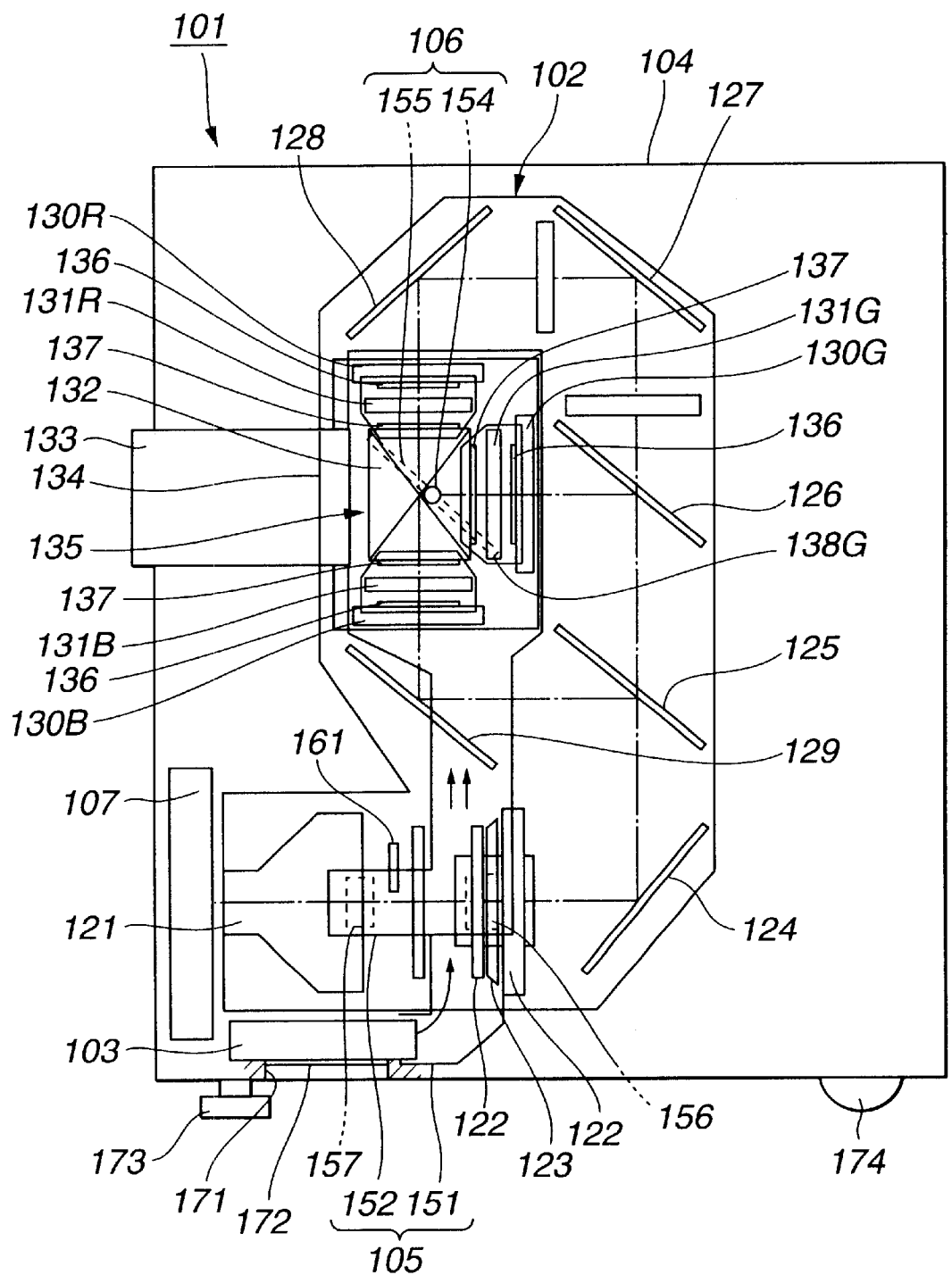
FIG. 13 is a schematic side view showing the projection display device of FIG. 12.
Figure 14:
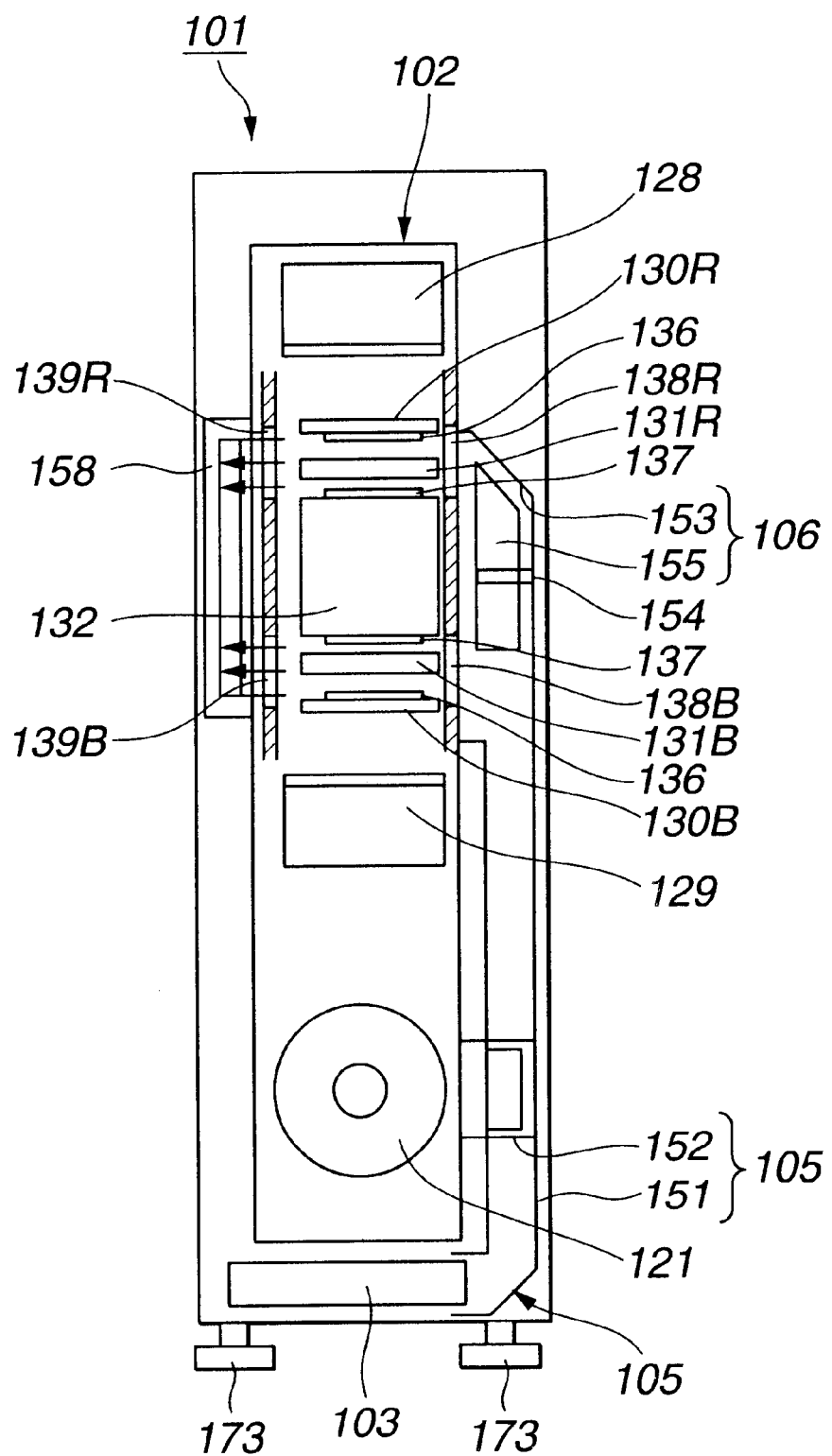
FIG. 14 is a view similar to FIG. 10, showing the projection display device of FIG. 12.

Referring to FIGS. 12–14, there is shown a second embodiment of a vertical projection display device according to the present invention.

A projection display device 101 is provided with an optical unit 102 including a light source 121, light valves 135 and a projection lens 133, a cooling fan or sirocco fan 103 for cooling the optical unit 102, and a vertically lengthened exterior cabinet or casing 104 having the optical unit 102 and the sirocco fan 103 mounted thereto, a duct 105 for bringing cooling air produced by the sirocco fan 103 to the optical unit 102, air-quantity control means 106 arranged in the duct 105 and for bringing cooling air produced by the sirocco fan 103 to the light valves 135 of the optical unit 102 at a predefined ratio, and a light-source exhaust fan 107.

Figure 15:
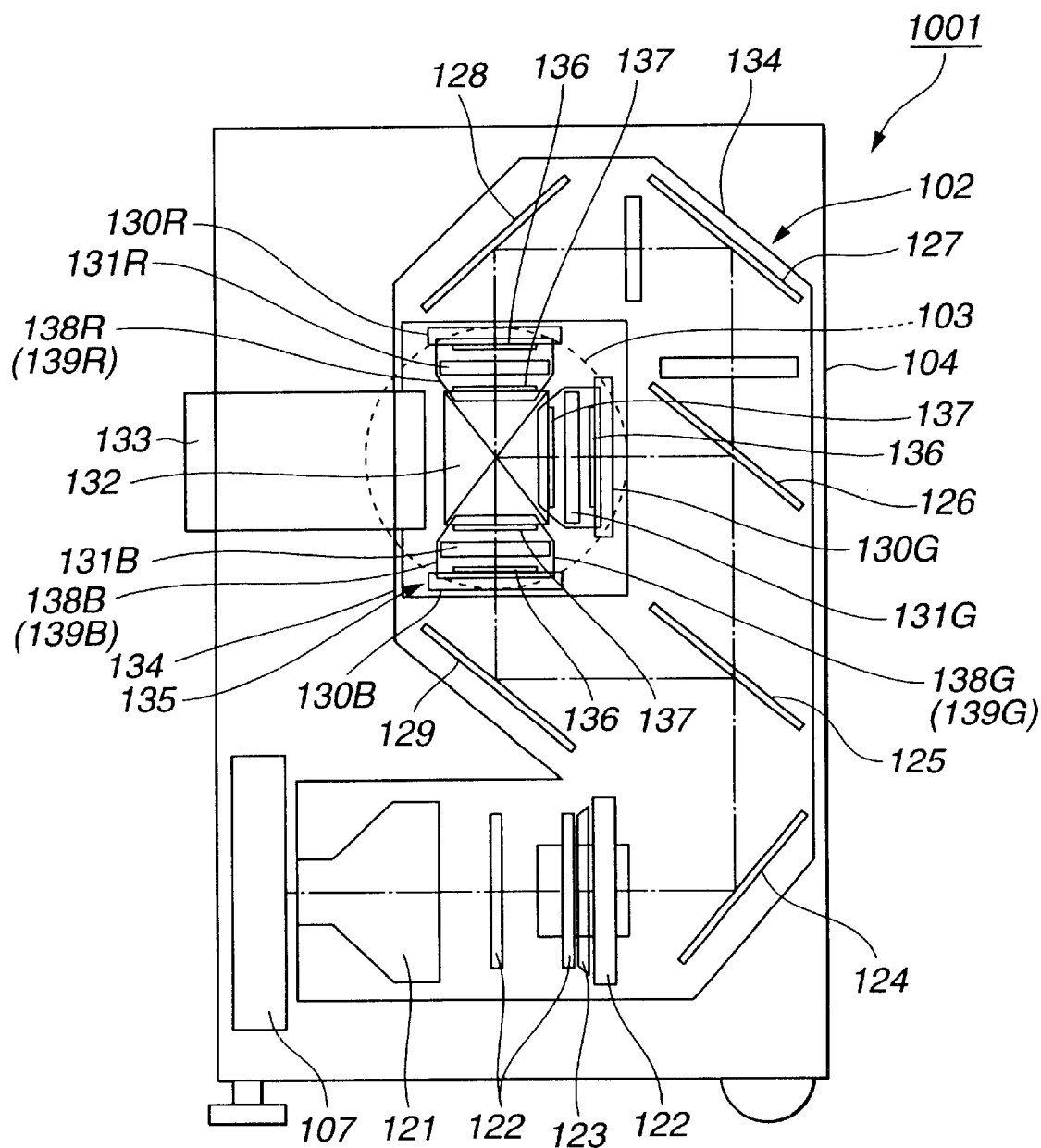
FIG. 15 is a view similar to FIG. 13, showing a traditional vertical projection display device.
Figure 16:
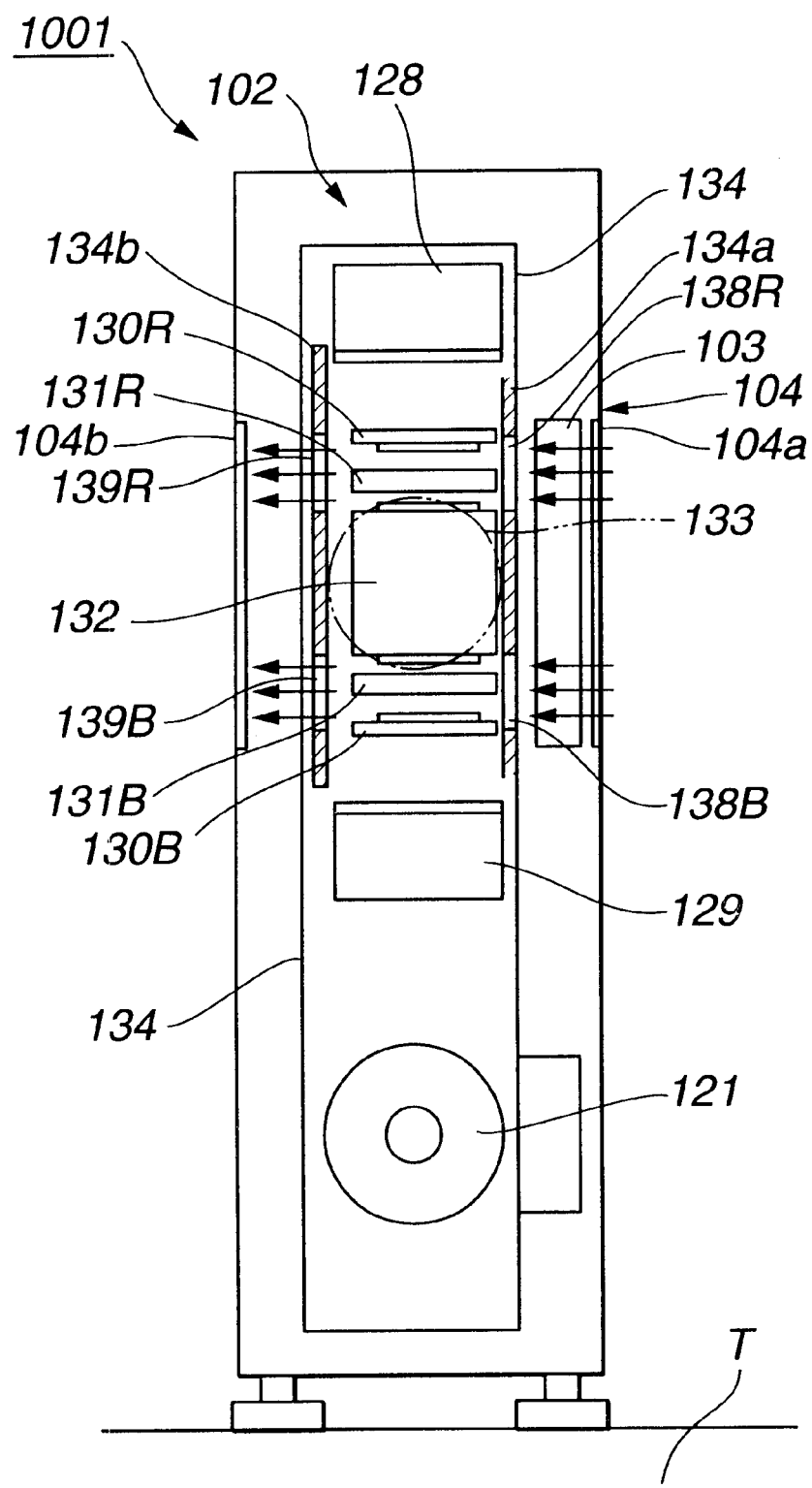
FIG. 16 is a view similar to FIG. 10, showing traditional vertical projection display device.
Figure 17:
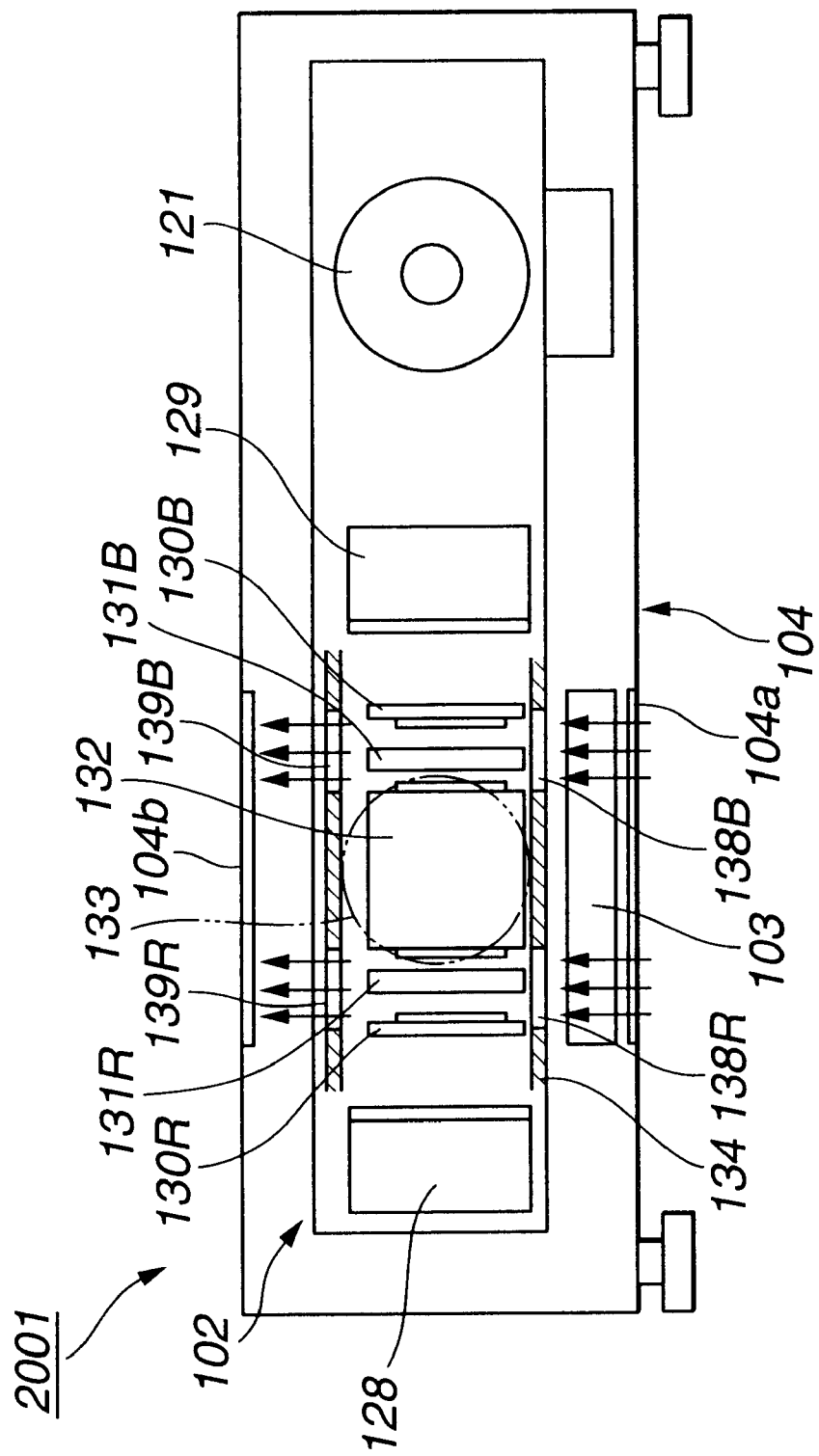
FIG. 17 is a view similar to FIG. 16, showing a traditional horizontal projection display device.

The optical unit 102 is disposed in the exterior cabinet 104 with the light source 121 side down and the light valves 135 side up. The optical unit 102 is of substantially the same structure as that of the traditional optical unit as shown in FIGS. 15–16, so that a redundant description is omitted.

The sirocco fan 103 is in the form of a flat sirocco fan or multiblade fan. The sirocco fan 103 is disposed between the light source 121 and a bottom face 104d of the exterior cabinet 104 with a ventilation port 103a facing a back face 104c of the exterior cabinet 104. Cooling air out of the ventilation port 103a of the sirocco fan 103 is brought to each part of the optical unit 102 through the duct 105. The sirocco fan 103 can be disposed on the bottom face of the vertical exterior cabinet 104 and not on the side face thereof, enabling lowered level of noise direcly reach an operator and an audience.

The duct 105 is provided with a first duct portion 151 for bringing cooling air out of the cooling fan 103 to the circumference of the cross prism 132 of the optical unit 102, and a second duct portion 152 for bringing the cooling air to the circumference of the light source 121

As shown in FIG. 13, the duct portion 151 extends to the circumference of the cross prism 132 via the side of a P/S converter element 123 of the optical unit 120. As shown in FIG. 14, an upper end of the first duct portion 151 is provided with an inclined face 153 for changing the direction of cooling air out of the sirocco fan 103, and the air-quantity control means 6 for controlling the air quantity of cooling air introduced into intake openings 138R, 138G, 138B arranged in the optical unit 102. Cooling air out of the sirocco fan 103 is changed in direction by roughly 90 by striking the inclined face 153, and is controlled in air quantity by the air-quantity control means 6 before being provided to the cross pnsm 132 through the intake openings 138R, 138G, 138B. Then, as shown in FIG. 12, air is exhausted outside, through a third duct 158, from an exhaust port 104b arranged in aface 104e of the exterior cabinet 104 on which the projection lens 133 is disposed.

The inclined face 153 is arranged, preferably, adjacent to the intake openings 138G, 138B for the light valves 135G, 135B. which require greater air quantity for cooling.

As shown in FIG. 14, the air-quantity control means 6 comprise an air-quantity control plate 155 rotatably mounted by a shaft 154. The air-quantity control plate 155 is rotated about the shaft 154 to control the angle of the air-quantity control plate 155, obtaining fine adjustment of the quantity of air introduced into the openings intake 138R, 138B. The air-quantity control means 106 can be operated from the outside through appropriate operation means (not shown).

As described above, the provision of an appropriate balance of the air quantity in accordance with the characteristic curves of air quantity vs. temperature for the intake openings 138R, 138G, 138B allows preservation of the deflection plates in an appropriated temperature range.

The results of the experiments revealed that the temperature of the light valves 135 can be reduced generally and most efficienty by distributing cooling air from the intake openings 138R, 138G, 138B to the deflection plates 136, 137 and the liquid-crystal panels 131R, 13G, 13B each interposed therebetween at the air-quantity ratio of 1:2:3 in this order.

Moreover, as shown in FIG. 13, a first opening 156 is arranged with the first duct portion 151 in the portion facing the P/S converter element 123 of the optical unit 120. Part of cooling air passes through the first opening 156 to strike the P/S converter element 123 for cooling thereof.

The second duct portion 152 is branched off from the vicinity of the first opening 156 to extend to the vicinity of the light source 121. A second opening 157 is arranged with the head of the second duct portion 152. Cooling air introduced into the second duct portion 152 through the first duct portion 151 passes through the second opening 157 to strike the light source 121 for cooling thereof. It is then exhausted outside from the front face of the exterior cabinet 104 together with exhaust air produced by the light-source exhaust fan 107. Since the exhaust port is arranged in the front face of the exterior cabinet 104, air can generally be exhausted in the direction of a screen where no person exists.

The second duct portion 152 includes an air-quantity control plate 161 downstream of the first opening 156, i.e. on the side of the second opening 157.

The air-quantity control plate 161 is actuated in synchronization with a slide switch (not shown) to allow adjustment of the air quantity for the P/S converter element 123 and the light source 121. In the power saving mode set to improve the long-term reliability of the light source 121, the output of the light source 121 is smaller, in accordance with which a reduction is possible in both the air quantity and noise by lowering the voltage, i.e. number of revolutions of the light-source exhaust fan 107. Moreover, the air quantity, i.e. number of revolutions of the cooling fan 103 may be adjusted in accordance with the output of the light source 121.

An air intake port 171 is arranged in the lower surface of the exterior cabinet 104 to correspond to the cooling fan 103. A filter 172 is mounted to the air intake port 171. The filter 172 serves to remove dust and the like contained in outside air so as to protect thereby the liquid-crystal panels 131R, 131G, 131B, the cross prism 132, etc. from those dust and the like. When using the above filter 172, the intake side inflow resistance is increased to lower the air quantity. In particular, when the cooling fan is in the form of an axial flow fan, noise is increased with lowered air quantity. When the cooling fan is in the form of a sirocco fan, the lowering of the air quantity cannot be avoided, but noise of the sirocco fan is rather reduced because of being enclosed in the exterior cabinet 104 due to the hermetic effect of the filter 172.

The duct 105 may be a member separate from the optical unit 102 and/or the exterior cabinet 104 for mounting to the exterior cabinet 104, or may be integrated therewith In the second embodiment, the air-quantity control means 106 are arranged rotatably and adjustably from the outside. It is understood that the present invention is also applicable to air-quantity control means fixed to or integrated with the duct to merely control the distribution of the air quantity.

Moreover, in the second embodiment, the air-quantity control means 106 are illustrated as one partition plate. Alternatively, the air-quantity control means 106 may include a plurality of parts, may be of the shape of a curved surface, and may be made of a porous material which passes part of cooling air.

While the present invention has been described with reference to specific embodiments chosen for purpose of illustration, it should be apparent that numerous modifications could be made thereto by those skilled in the art without departing from the basic concept and scope of the present invention.

What is claimed is:

1. A projection display device, comprising:
    an optical unit comprising a light source and a group of light valves, said light source generating a light incident on one or more of said group of light valves;

means for cooling said optical unit, said cooling means comprising a sirocco fan, said cooling means comprising a sirocco fan, a duct for bringing a cooling air produced by said sirocco fan to at least said group of light valves, said duct extending from said sirocco fan adjacent said group of light valves so that said cooling air from said duct is incident on said group of light valves, and air quantity controlling means arranged in said duct for controlling an air quantity of said cooling air; and an exterior cabinet accommodating said optical unit and said cooling means.

2. The projection display device as claimed in claim 1, wherein said group of light valves comprises a first light valve for modulating red light, a second light valve for modulating green light, and a third light valve for modulating blue light, and said air-quantity controlling means bring said cooling air to said first, second and third light valves at a desired ratio.

3. The projection display device as claimed in claim 2, wherein said air-quantity controlling means bring said cooling air to said first, second and third light valves at a ratio of 1:2:3.

4. The projection display device as claimed in claim 3, wherein said air-quantity controlling means are constructed so that air-quantity adjustment is possible from the outside of said exterior cabinet.

5. The projection display device as claimed in claim 1, wherein said duct bring s part of said cooling air to said light source of said optical unit.

6. The projection display device as claimed in claim 5, wherein said duct is arranged with a second air quantity controlling means positioned therein for adjusting said air quantity of said cooling air that is diverted to said light source.

7. The projection display device as claimed in claim 6, wherein said second air quantity controlling means comprises a plate positioned within said duct for diverting said cooling air and adjusting said air quantity of said cooling air in accordance with an output intensity said light source.

8. The projection display device as claimed in claim 5, further comprising a fan for dispersing heat generated by said light source, said fan providing an air quantity controlled in accordance with output of said light source.

9. The projection display device as claimed in claim 5, wherein said sirocco fan has the number of revolutions controlled in accordance with output of said light source.

10. The projection display device as claimed in claim 5, wherein said exterior cabinet has an exhaust port for cooling air in a surface on which a projection lens is disposed.

11. A projection display device, comprising:

an optical unit comprising a light source and a group of light valves, said light source generating a light incident on one or more of said group of light valves;

means for cooling said optical unit, said cooling means comprising a sirocco fan and a duct for bringing a cooling air produced by said sirocco fan to that least said group of light valves, said duct extending from said sirocco fan to a position adjacent said group of light valves so that said cooling air from said duct is incident on said group of light valves; and a vertically situated exterior cabinet accommodating said optical unit and said cooling means so that said light source is positioned under said group of light valves, said cooling means being disposed in a lower portion of said exterior cabinet.

12. The projection display device as claimed in claim 11, Wherein said group of light valves comprises a first light valve for modulating red light, a second light valve for modulating green light, and a third light valve for modulating blue light, and said air-quantity controlling means bring said cooling air to said first, second and third light valves at a desired ratio.

13. The projection display device as claimed in claim 11, wherein said air-quantity controlling means bring said cooling air to said first, second and third light valves at a ratio of 1:2:3.

14. The projection display device as claimed in claim 13, wherein said air-quantity controlling means are constructed so that air-quantity adjustment is possible from the outside of said exterior cabinet.

15. The projection display device as claimed in claim 11, wherein said duct brings part of said cooling air to said light source of said optical unit.

16. The projection display device as claimed in claim 15, wherein said duct is arranged with a second air quantity controlling means positioned therein for adjusting said air quantity of said cooling air that is diverted to said light source.

17. The projection display device as claimed in claim 16, wherein said second air quantity controlling means comprises a plate positioned within said duct for diverting said cooling air and adjusting said air quantity of said cooling air in accordance with an output intensity of said light source.

18. The projection display device as claimed in claim 15, further comprising a fan for dispersing heat generated by said light, source said fan providing an air quantity controlled in accordance with output of said light source.

19. The projection display device as claimed in claim 15, wherein said sirocco fan has the number of revolutions controlled in accordance with output of said light source.

20. The projection display device as claimed in claim 15, wherein said exterior cabinet has an exhaust port for cooling air in a surface on which a projection lens is disposed.

* * * * *

UNITED STATES PATENT AND TRADEMARK OFFICE
CERTIFICATE OF CORRECTION

PATENT NO. : 6,471,357 B1 Page 1 of 1
DATED : October 29, 2002
INVENTOR(S) : Hara et al.

It is certified that error appears in the above-identified patent and that said Letters Patent is hereby corrected as shown below:

Column 11,
Lines 2-3, delete the second occurrence of "said cooling means comprising a sirocco fan"

Signed and Sealed this

Eleventh Day of January, 2005

JON W. DUDAS
*Director of the United States Patent and Trademark Office*